United States Patent [19]

Schmaeng

[11] 4,181,378

[45] Jan. 1, 1980

[54] DOCTOR BEARING INTEGRAL PRESSURE LUBRICATION

[75] Inventor: John F. Schmaeng, Rockton, Ill.

[73] Assignee: Beloit Corporation, Beloit, Wis.

[21] Appl. No.: 915,369

[22] Filed: Jun. 14, 1978

[51] Int. Cl.² ............................................ F16C 33/74
[52] U.S. Cl. .................................. 308/36.1; 308/122; 308/240
[58] Field of Search .................... 308/31.1–36.5, 308/78, 93, 107, 122, 240, 187, 5 R, 4 R, 3.5, 72

[56] References Cited

U.S. PATENT DOCUMENTS

| | | | |
|---|---|---|---|
| 429,507 | 6/1890 | Conradson | 308/78 X |
| 1,132,759 | 3/1915 | Bache | 308/72 X |
| 2,629,639 | 2/1953 | Johansen | 308/78 |
| 2,757,990 | 8/1956 | Barlow | 308/78 |
| 3,201,183 | 8/1965 | Buske | 308/78 |
| 3,210,137 | 10/1965 | Williams | 308/122 X |
| 3,378,318 | 4/1968 | Rafique et al. | 308/78 |
| 3,380,789 | 4/1968 | Nigh | 308/78 |
| 3,394,972 | 7/1968 | Bossler, Jr. | 308/122 |
| 3,400,937 | 9/1968 | Crankshaw | 308/36.1 X |
| 3,510,177 | 5/1970 | Shimula | 308/36.1 |
| 3,510,177 | 5/1970 | Shimula | 308/36.1 |
| 3,522,977 | 8/1970 | Lee et al. | 308/78 |
| 3,687,510 | 8/1972 | Cooper | 308/122 |
| 3,973,781 | 8/1976 | Grörich | 308/36.1 X |

*Primary Examiner*—Douglas C. Butler
*Attorney, Agent, or Firm*—Hill, Van Santen, Steadman, Chiara & Simpson

[57] ABSTRACT

A doctor assembly for a paper making machine including a force fed lubricated bearing structure therefor with a doctor shaft having a journal axially oscillatable in an annular bearing housing with a bearing sleeve insert between the journal and the housing having axially extending grooves therein with annular outer end seals axially outwardly of the bearing insert and annular lip seals at the end of the bearing insert carried on the bearing and permitting flow of lubricant axially outwardly from the bearing to the annular pressure spaces between the lip seals and end seals and passages extending between the annular pressure chambers between the seals to the center of the bearing and having check valves in the passages preventing back flow but permitting lubricant to flow from the annular pressure chambers to the center of the bearing.

10 Claims, 6 Drawing Figures

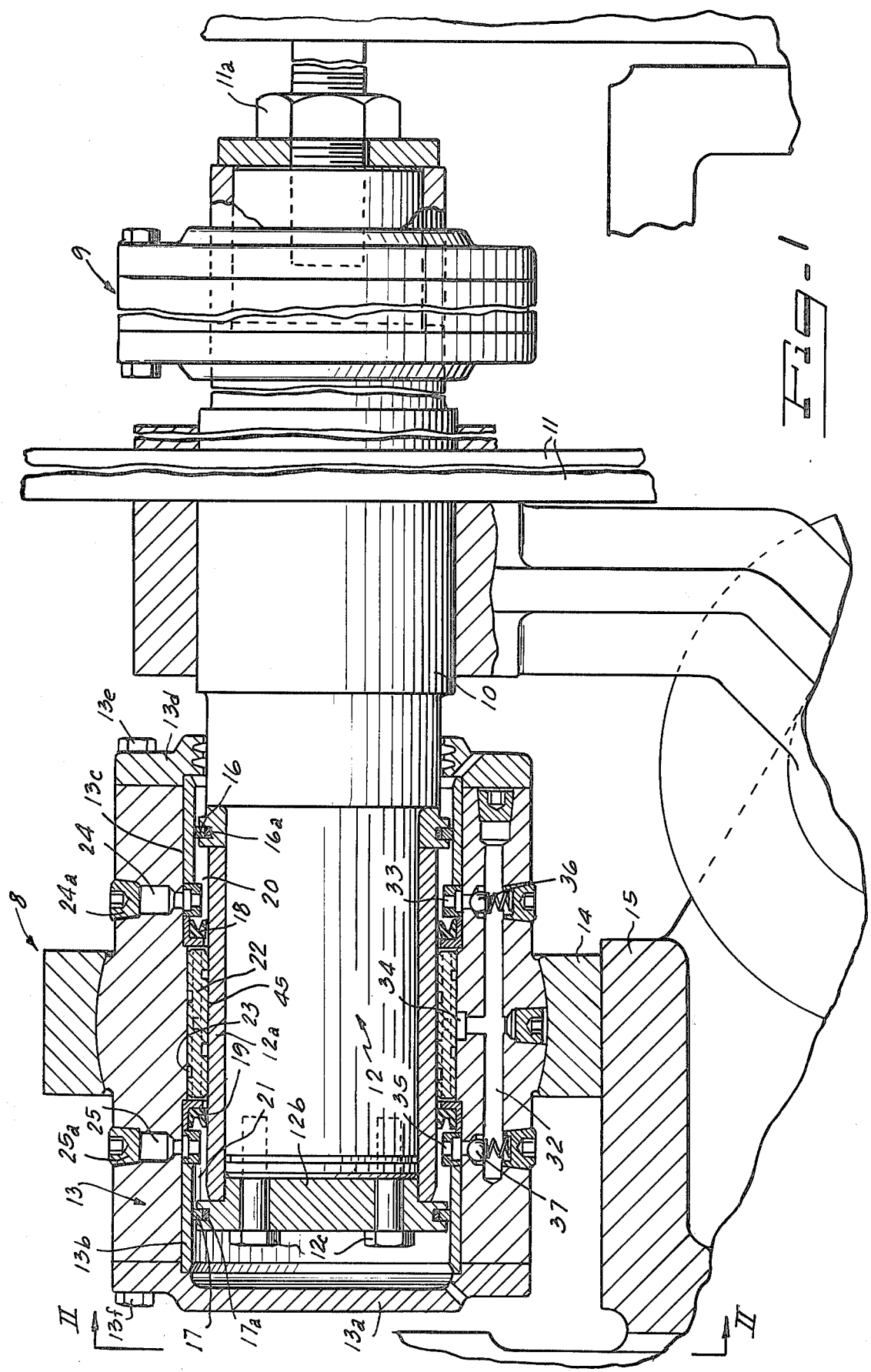

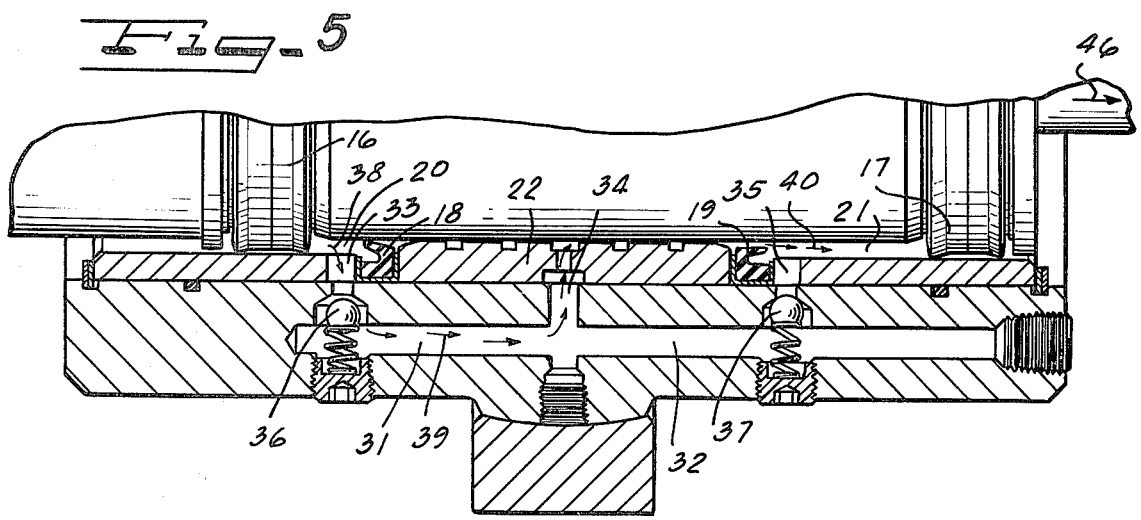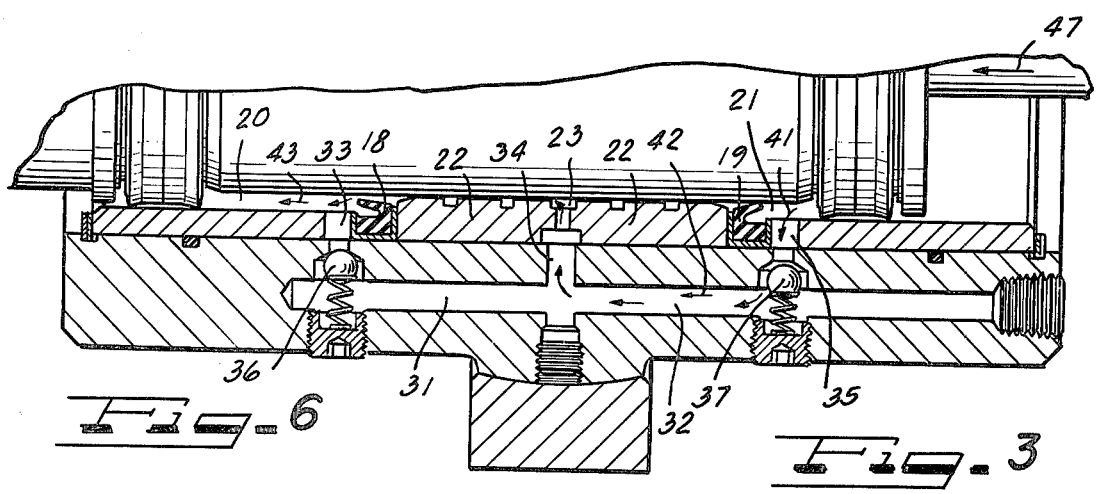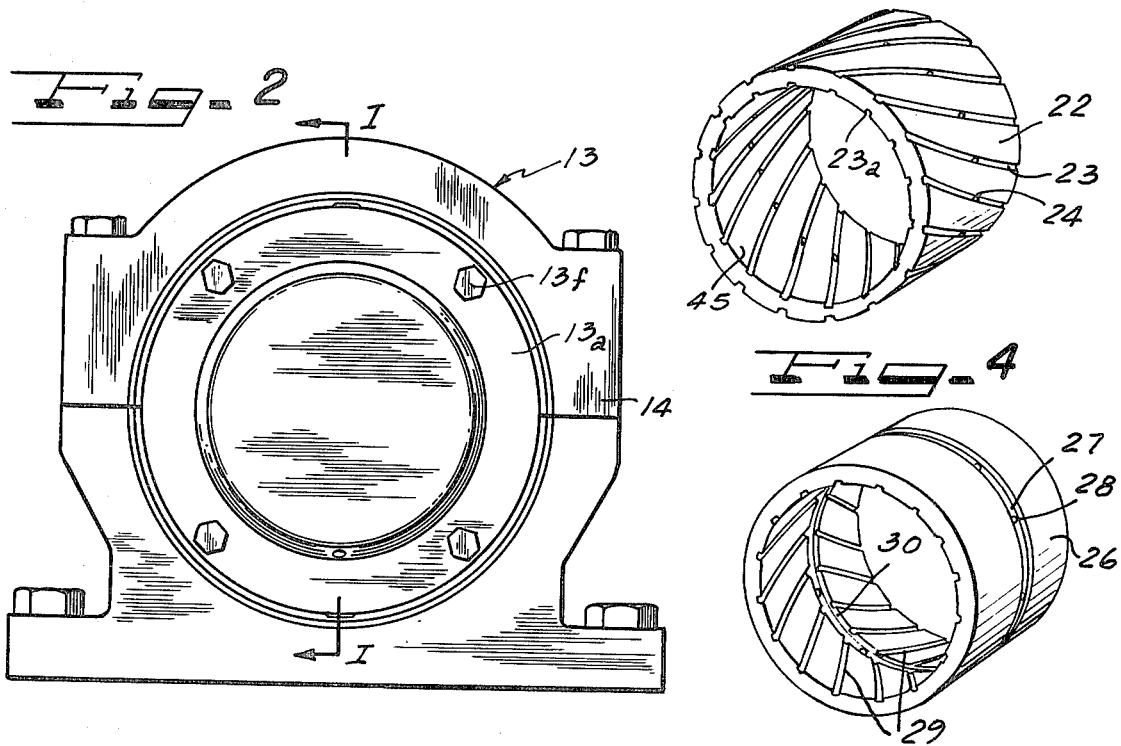

DOCTOR BEARING INTEGRAL PRESSURE LUBRICATION

BACKGROUND OF THE INVENTION

The present invention relates to improvements in paper making machines, and more particularly to an improved force fed lubrication system for doctor bearings for doctor blades in a paper machine.

Doctor blades are used in many locations for doctoring rolls in a paper making machine, and the blades are supported in blade holders supported by doctor backs which require end bearings and are oscillated in an axial direction so as to prevent forming grooves in the rolls with which they coact. In wide commercial paper making machines, the doctor assemblies have substantial weight, and since they move continually, means must be provided for lubricating the end bearings. The bearings are annular because the doctor assemblies must accommodate tilting away from the roll for servicing and must accommodate movement toward the roll for operation and adjustment. The bearings must operate continually under extremes of moisture and heat, and are subjected to heavy shock loads so that the lubrication problem is substantial. Attempts have been made to try various types of bearings with limited success, and the accompanying disadvantage of existing bearings and their lubrication problems. In the use of sleeve bearings or of ball bushing bearings, there are inherent difficulties. The lubrication available makes it impossible to provide uniform lubrication other than the very end balls of the bearing. The axial oscillation in one rotary position causes local hardening or Brinelling of the races which cause hang-up in rotation so that it is impossible to properly rotate and load the doctor relative to the roll with which it is acting. Further, existing bearings are expensive, and the lubrication systems are intricate and difficult to maintain and, of course, failure cannot be tolerated during operation and further, such lubrication systems must act without the danger of lubrication coming into contact with the surfaces or parts that contact the traveling paper web so as to contaminate the web with lubricant.

It is accordingly an object of the present invention to provide an improved lubrication system for an oscillating doctor bearing for a paper making machine.

A further object of the invention is to provide an improved bearing assembly wherein continual oscillation occurs between the journal and bearing wherein lubrication is automatic or self-effecting, and lubricant under pressure is continually delivered to the bearing surfaces.

A further object of the invention is to provide a method and apparatus whereby the relative movement between the journals and bearing are utilized to provide a continual pumped supply of lubricant to the bearing surfaces embodying a structure which is relatively inexpensive and uncomplicated and is capable of continual operation without attention and provides for improved lubrication between the surfaces.

Other objects, advantages and features, as well as equivalent structures and methods which are intended to be covered herein will become more apparent with the teaching of the principles of the present invention in connection with the disclosure of the preferred embodiment in the specification, claims and drawings, in which:

DRAWINGS

FIG. 1 is a vertical sectional view taken substantially along a line through the axis of an oscillating bearing for a doctor embodying the principles of the present invention;

FIG. 2 is an end view taken substantially along line II—II of FIG. 1;

FIG. 3 is a perspective view of one form of bearing bushing insert utilized;

FIG. 4 is a perspective view of another form of bushing bearing insert;

FIG. 5 is a fragmentary sectional view of a bearing arrangement illustrating the relative position of parts as the journal moves to the right; and FIG. 6 is a view similar to FIG. 5 showing the relative position of parts as the journal moves to the left.

DESCRIPTION

As illustrated in FIG. 1, a doctor back journal 10 carries a doctor back shown somewhat schematically at 11, and the shaft has a journal 12 at its end. The back 11 has one bearing assembly 8 at one end and another at the other end, both being of generally the same construction. The journal attachment to the back for the other end is shown generally at 9. Driving mechanism 11a for the assembly will be provided by structure such as a shaft extension for oscillating the back and for permitting rotation to the desired rotatable setting. In operation, oscillations will be continuous and will be on the order of $\frac{1}{4}"$ to $\frac{3}{4}"$ in length, at the frequency desired, such as 16 per minute.

The doctor journal 12 is supported in a bearing housing 13 which is provided of a number of parts as illustrated in the drawing and may be made of various constructions to provide adequate bearing support. The bearing housing as illustrated in FIGS. 1 and 2 has an end cap 13a held in place by an annular array of cap screws 13f threaded into the annular main body of the bearing housing. The housing is supported on a bearing support ring 14, which is split for assembly as illustrated in FIG. 2, and is supported on a frame part 15. Within the annular bearing housing 13 are seal sleeves 13b and 13c which are smooth on their inner surfaces for coacting with axially sliding outer seals 16 and 17 on the journal. The seal 16 is an annular grooved ring with a resilient member seated therein such as O-ring 16a. The seal 17 at the end of the journal is supported on a plate 12b bolted to the end of the journal by cap screws 12c. The seal 17 has an annular groove with an O-ring 17a therein. The seals 16 and 17 will be referred to as the first and second axial outer seals because they are the furthermost axial outer parts of the working mechanism as will become more clear later herein.

The housing 13 has a bearing surface supporting the journal 12 therein, and the bearing surface is shown as provided by an annular grooved bushing 22 having grooves 23 therein. The bushing may take various forms, and two preferred forms are illustrated in FIGS. 3 and 4. The bushing 22 is mounted stationarily within the bearing housing, and has a smooth inner surface to support an annular journal collar 13a mounted on the journal and having a smooth outer surface. The journal collar 12a will be considered as part of the journal and is movable axially therewith as are the outer seals 16 and 17.

The bearing housing carries two inner seals 18 and 19 which are in the form of lip seals. The lip seals function to permit the flow of lubricant axially outwardly from the bearing bushing 20 to, but to prevent the flow of lubricant axially back toward the bearing bushing, which has an inner bearing surface 45.

As illustrated in FIG. 3, the bearing bushing 22 has generally axially extending grooves 23 on its outer surface and 23a on its inner surface. Communicating with the grooves are radially drilled holes 24, one for each groove, to permit the flow of lubricant from outside of the bearing to inside thereof, and the inner grooves 23a permit lubricant to flow axially in both directions. As will later be seen, it is an advantage to utilize a grooved bushing or bearing surface which permits the flow of lubricant such as oil axially outwardly, although the concepts of the invention will operate with any type of bearing surface which will permit the movement of oil between the mating moving surfaces.

FIG. 4 illustrates another form of bearing with a herringbone pattern on the inner sliding surface of the bushing. The bushing is shown at 26 with an annular groove around its outer surface at 27 and a plurality of radially inwardly drilled holes 28 leading to an inner groove 30. The inner groove communicates with the generally outwardly axially extending grooves 29.

The axially outer seals 16 and 17 define an oil pressure space 20 and 21 between them and the inner seals 18 and 19. The outer seals 16 and 17 will reciprocate with the journal, and the spaces 20 and 21 will alternately increase and decrease in size so as to pressurize the lubricant therein and force or pump it through the system which is provided into the bearing surface. To supply oil to the spaces, radial drilled holes 24 and 25 communicate therewith for initially filling the spaces, and plugs 24a and 25a will be threaded into the holes. However, the passages 24 and 25 must be closed during operation so as to permit pressure buildup in the spaces 20 and 21.

Lubricant is led from the pressure chambers 20 and 21 to the bearing surface by first and second passages 31 and 32. These passages communicate with the pressure chambers 20 and 21 through radial openings 33 and 35, FIG. 1. The passages 31 and 32 each lead to the bearing surface 45, and in the preferred form illustrated, lead through a single inlet 34. The inlet 34 communicates with the annular groove in the bearing bushing so that oil delivered under pressure thereto is forced directly into the surface 45 to maintain the journal under lubrication as it slides axially back and forth.

In each of the lubricant passages 31 and 32, are reverse flow preventing check valves 36 and 37. These valves prevent the lubricant from being pushed back into the pressure chamber which is getting larger, when the other pressure chamber is reducing in size, thus, forcing the oil to travel into the bearing space. This operation will become more clear in connection with the following description of FIGS. 5 and 6.

FIG. 5 illustrates the relative operation of the parts as the journal is oscillating to the right, as indicated by the arrowed line 46. When the journal moves to the right, the oil pressure space 20 is getting smaller because the outer seal 16 moves to the right. The inner lip seal 18 prevents the flow of lubricant past it so that the lubricant is forced out into the passage 31 through the port 38 and past the check valve 36 which opens. The other check valve 37 closes, so that the oil must flow as indicated by the arrowed lined 38, past the check valve as indicated by the arrowed lines 39, and into the bearing space. The lip seal 19 on the left permits flow of oil outwardly past it into the space 21, as indicated by the arrowed lines 40, so that this space 21 in expanding actually creates a suction to aid the flow of oil through the passage 31. Thus, a double positive pressure pumping effect occurs, with the oil being forced by the reduction in size of the pressure chamber 20, and being drawn by the increase in size of the pressure chamber 21.

FIG. 6 shows the relative coaction of the parts as the journal moves to the left as indicated by the arrowed line 47. When this occurs, the pressure chamber on the right 21 gets smaller in size forcing the oil out as indicated by the arrowed line 41, through the port 35 past the check valve 37 and through the passage 32 as indicated by the arrowed lines 42. The oil flows up into the bearing bushing, being forced there because the check valve on the left 36 closes. The left lip seal 18 permits oil to flow to the left as indicated by the arrowed lines 43 into the expanding pressure chamber 20.

Thus, it will be seen that I have provided a positive pressure lubrication system for a reciprocating bearing which meets the objectives and advantages above set forth. The seals, check valves and various parts may take various modifications in form as will be apparent to those versed in the art, in accordance with the principles described herein.

I claim as my invention:

1. A force fed lubricated bearing structure such as for a doctor bearing in a paper making machine comprising in combination:

a doctor shaft having a journal axially oscillatable;

an annular bearing housing surrounding the journal and having a bearing surface element in supporting sliding engagement with the journal with first and second annular spaces between the journal and bearing housing at the ends of the bearing surface;

first and second annular outer end seals at the axial outer ends of said annular spaces and being mounted for axial movement with the journal;

first and second annular inner lip seals spaced axially inwardly of said end seals and forming lubrication pressure chambers between the lip seas and end seals permitting the axial outward flow of lubricant to pass the lip seals and preventing the axial flow of lubricant in an inward direction;

first and second lubrication flow passages in the housing communicating respectively between said pressure chambers and said bearing surface;

and check valves in each of said passages permitting flow from said pressure chambers to the bearing surface and preventing reverse flow therein.

2. A force fed lubricated bearing structure such as for a doctor bearing in a paper making machine constructed in accordance with claim 1:

wherein said lubrication flow passages communicate through a single center passage with the bearing surface.

3. A force fed lubricated bearing structure such as for a doctor bearing in a paper making machine constructed in accordance with claim 1:

wherein said bearing surface element is in the form of an annular insert having axial passages therethrough leading axially from the lubrication flow passages to said lip seals.

4. A force fed lubricated bearing structure such as for a doctor bearing in a paper making machine constructed in accordance with claim 3:

wherein the passages in the bearing insert are in the form of a herringbone pattern.

5. A force fed lubricated bearing structure such as for a doctor bearing in a paper making machine constructed in accordance with claim 1:
wherein said check valves in said lubrication flow passages are located at the location where the passages communicate with said annular spaces.

6. A force fed lubricated bearing structure such as a doctor bearing comprising in combination:
an axially oscillatable shaft member having a journal;
a bearing housing surrounding the journal with a bearing surface in supporting sliding engagement with the journal;
means providing a lubricant pressure chamber diminishing in size with axial movement of said journal relative to said bearing surface in one direction for pressurizing lubricant in said chamber;
a lubrication passage communicating between said pressure chamber and said bearing surface so that lubricant under pressure flows through the passage to the bearing surface with movement of the journal in an axial direction relative to the bearing surface;
and means supplying lubricant to said pressure chamber.

7. A force fed lubricated bearing structure such as a doctor bearing constructed in accordance with claim 6: wherein said chamber is formed between the journal and bearing.

8. A force fed lubricated bearing structure such as a doctor bearing constructed in accordance with claim 6:
including a check valve in said lubrication passage permitting flow only in the direction between the pressure chamber and bearing surface and preventing flow in the opposite direction.

9. The method of force feeding a lubricated bearing structure such as a doctor bearing comprising the steps:
providing a journal slidingly enclosed in a bearing and oscillatable in an axial direction therein with a bearing surface supporting the journal;
providing a lubricant pressure chamber;
diminishing the size of said chamber with axial movement of the journal in one direction relative to the bearing and pressurizing lubricant in said chamber;
delivering the pressurized lubricant to the bearing surface from said chamber;
and supplying lubricant to said chamber for a constant supply of lubricant to the bearing and journal.

10. The method of force feeding lubricant to a bearing structure such as a doctor bearing in accordance with the steps of claim 9:
including providing the lubricant pressure chamber between the journal and bearing so that axial movement of the journal relative to the bearing diminishes the size of the chamber.

* * * * *